United States Patent [19]

Caplin

[11] Patent Number: 4,505,230
[45] Date of Patent: Mar. 19, 1985

[54] FLUIDIZED BED COMBUSTION UNITS

[75] Inventor: Peter B. Caplin, Sunbury on Thames, England

[73] Assignee: The Energy Equipment Company Ltd., Bedfordshire, England

[21] Appl. No.: 387,876

[22] PCT Filed: Sep. 28, 1981

[86] PCT No.: PCT/GB81/00204
§ 371 Date: Jun. 7, 1982
§ 102(e) Date: Jun. 7, 1982

[87] PCT Pub. No.: WO82/01239
PCT Pub. Date: Apr. 15, 1982

[30] Foreign Application Priority Data

Oct. 6, 1982 [GB] United Kingdom ............... 8032112

[51] Int. Cl.³ .............................................. F22B 1/00
[52] U.S. Cl. ..................... 122/4 D; 110/204; 110/234; 110/245; 110/263; 110/347; 122/7 R; 431/5; 431/7
[58] Field of Search ............... 122/4 D, 7 R; 110/245, 110/263, 204, 234, 347, 348, 342; 431/5, 7, 170; 165/104.16

[56] References Cited

U.S. PATENT DOCUMENTS

| 2,934,551 | 4/1960 | Stringer | 122/4 D |
| 3,672,839 | 6/1972 | Moore | 431/7 |
| 3,884,193 | 5/1975 | Bryers | 122/7 R |
| 4,282,009 | 8/1981 | Belke et al. | 110/234 |
| 4,343,247 | 8/1982 | Chronowski | 110/245 |
| 4,356,778 | 11/1982 | McRee, Jr. | 110/234 |

FOREIGN PATENT DOCUMENTS 2030689 4/1980 United Kingdom ............... 431/170

Primary Examiner—Edward G. Favors
Assistant Examiner—Steven E. Warner
Attorney, Agent, or Firm—Murray Schaffer

[57] ABSTRACT

The specification describes arrangements in which the attemperation or control of the temperature of a fluidized bed in a fluidized bed combustion unit effected by means of the mixture of a variable proportion of inert gas with fluidizing air fed to the bed may be supplemented with steam. Supplementation with steam being effected to a relatively minor extent during normal operation of the unit but being effected to a major extent when the temperature of the bed passes outside the range at which attemperation may be effected by use of recycled flue gas. The combustion unit is described in use within an arrangement including process plant in the form of a rotary drum dryer.

5 Claims, 1 Drawing Figure

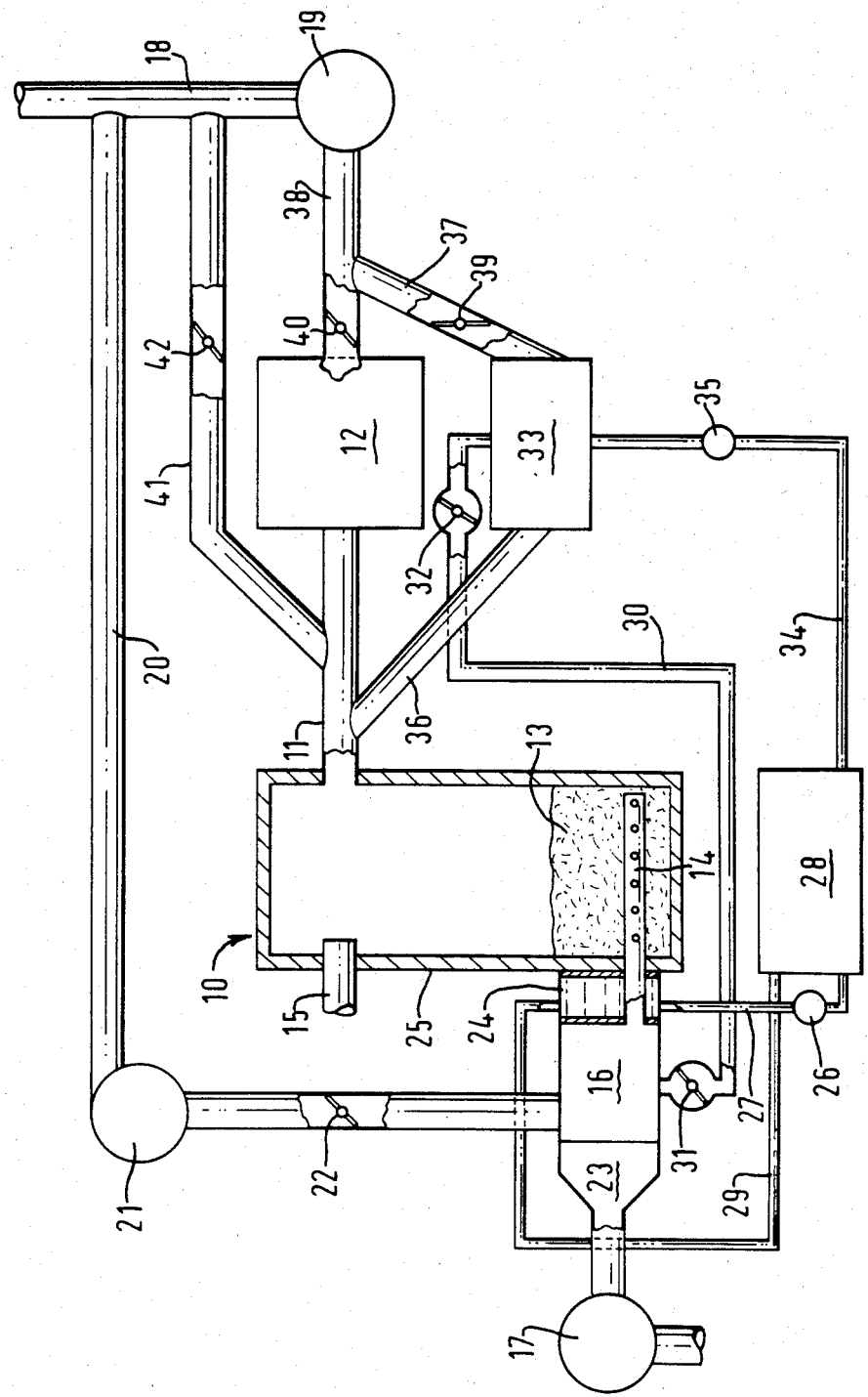

FLUIDIZED BED COMBUSTION UNITS

TECHNICAL FIELD

The invention concerns fluidized bed combustion units and is particularly concerned with such units including means for their supplementary attemperation, for example in rapid shut-down conditions.

BACKGROUND ART

A fluidized bed combustion unit generally comprises a bed of particulate material to which air is passed by one of a number of arrangements (for example by an array of sparge tubes extending generally horizontally through the material of the bed) to fluidize the material of the bed and support combustion of fuel fed to the bed. The bed material may be formed of the material to be combusted or be formed of an inert particulate material (for example sand) to which air and fuel is passed. The air passed to the bed to fluidize the bed supports combustion of fuel passed to the bed and may also support combustion of volatile gases generated within the bed which may continue to burn in the volume above the bed (second phase combustion).

Fluidized bed combustion units may be used as primary heat generators (a hot gas generator or boiler for example) as gas producer plant (in which the bed is operated endothermically as a gas producer) or as a dryer (in which there is substantially complete combustion within the bed).

The fluidizing air fed to the bed may be augmented with an inert gas (for example recycled flue gas) in order to ease control of the operation of the bed.

A fluidized bed combustion unit when used as a hot gas generator is normally enclosed within a reaction vessel completely lined with refractory materials and provided with no means for cooling the above bed, secondary phase combustion zone. As a result when such a hot gas generator is shut-down from a full working load condition, particularly if it is a near instantaneous, trip or crash shut-down, difficulties result from heat lock within the vessel and the effects of heat radiation from the refractory lining material back onto the bed.

In addition to the heat lock and back radiation difficulties the fluidized bed normally contains relatively high proportion of hydrocarbon fuel (for example coal) which at full load operating conditions may be as much as 15% by weight of the total bed weight. The fuel in the bed may contribute to the magnitude of the heat contained within the bed particularly when there is a slippage of air into the bed which slippage may be promoted, for example, by an induced draft fan in the plant served by the hot gas generator. Where such air slippage occurs the air promotes low level, but significant, combustion of the hydrocarbon fuel in the bed causing the bed temperature to rise.

In a relatively short space of time this increase in bed temperature may lead to clinkering of the bed material which it will be appreciated is now substantially static.

DISCLOSURE OF THE INVENTION

In accordance with one aspect the invention provides a fluidized bed combustion unit arrangement including means for passing fluidizing gas to a bed of particulate material to fluidize the bed of material and support combustion of fuel passed thereto, means for mixing in variable proportions of air, an inert gas and steam to form the fluidizing gas, the steam being used to supplement attemperation or control of the temperature of the bed provided by the inert gas.

The bed material may be an inert particulate material such as sand and the fluidizing gas may be fed thereto via an array of sparge tubes or pipes located with the bed material to extend horizontally therethrough.

Preferably the steam is generated in means abstracting heat from waste gases issuing from the combustion unit.

Advantageously means are provided for enabling flue gas issuing from the apparatus to be used as the inert gas.

A second aspect of the invention provides a method of operating a fluidized bed combustion unit arrangement in which fluidizing gas is fed to a bed of particulate material to fluidize the bed and support combustion of fuel passed thereto wherein the fluidizing gas is formed by mixing in variable proportions air, an inert gas and steam, the steam being provided to effect attemperation or control of the temperature of the bed supplementing the attemperation provided by the inert gas.

An embodiment of the invention will now be described with reference to the accompanying drawings in which:

BRIEF DESCRIPTION OF THE DRAWINGS

FIG. 1, diagrammatically illustrates an arrangement embodying the invention in which a fluidized bed combustion unit hot gas generator is used to supply heat to process plant.

The Figure shows a fluidized bed combustion unit 10 operating as a hot gas generator and feeding hot gas via a duct 11 to process plant 12 in which the heat in the gas is used. Process plant 12 may be for example a rotary drum dryer.

Fluidizing gas is fed to a bed 13 of inert particulate material in the combustion unit 10 via an array of sparge tubes or pipes 14 located, as shown, within the bed material to extend generally horizontally therethrough. It will be appreciated that more than one array of sparge tubes may be provided to fluidize the bed 13.

Suitable means 15 are provided in the unit 10 for supplying fuel (coal, oil, peat or other combustible material) to the bed 13. The fluidizing gas fed to the sparge tubes 14 is taken from a plenum chamber 16 and comprises a mixture of air drawn from an induced draft fan 17 and recycled flue gas taken from the chimney 18 of the plant to which gas is drawn after passage through the process plant 12 by a fan 19. Recycled flue gases pass from the stack 18 via ducting 20 including a fan 21 and control valve 22 as shown. Recycled flue gases provide attemperation or control of the operation of the fluidized bed 13 such as is described in our published U.K. Application No. 2030689A.

Air fed from the induced draft fan 17 to the plenum chamber 16 may on starting the arrangement be preheated in a preheat burner 23. Heating of air fed to the sparge tubes 14 and thence to the bed 13 is continued after initial start-up until the temperature of the bed is such that stable autothermic operation is achieved at which time fuel fed to the bed combusts and maintains the temperature of the bed at a level sufficient to support the combustion of further fuel fed to the bed.

A water jacket 24 is provided between the plenum chamber 16 and the wall 25 of the unit 10 to which softened water is passed by a pump 26 in a line 27 from a main water feed header 28. This softened water is used to cool the tube plates of the sparge tubes 14 (i.e. the joint at which the sparge tubes carrying hot gases are fixed to the wall 25 of unit 10) and is returned to the header 28 via a re-turn line 29 as shown. This arrangement of cooling the ends of the sparge tubes where they join the wall of unit 10 is substantially as described in our published U.K. Patent Application Ser. No. 2039350A.

The recycled flue gas is substantially inert and does not act to support combustion of fuel fed to the unit 10. Control of operation of the bed 13 may therefore be effected by varying the amount of recycled flue gas fed to plenum chamber 16 (and therefore the proportion of flue gas in the fluidizing gas fed to the bed 13) in accordance with the thermal demand placed upon the unit 10. The thermal demand may be measured in any suitable way, for example by a sensor (not shown) measuring the temperature of the bed or of the volume above the bed. Such a sensor may also be used to control operation of the fuel feed device 15.

We propose that in addition to the attemperation and control of the temperature of the bed 13 by the use of recycled flue gas, that the bed temperature be further controlled and attemperated by the addition to the fluidizing gas passed thereto of steam.

In accordance with our proposal steam is fed to the plenum chamber 16 via a duct 30 including control valves 31 and 32, from a waste heat boiler 33. The water input to the waste heat boiler 33 is via line 34 including a pump 35 from the softened water header 28 as shown. The boiler 33 is provided with heat via a gas duct 36 branching from duct 11 coupling unit 10 to plant 12. The cool gas outlet of boiler 33 is fed via a duct 37 to join the cool gas outlet 38 of plant 12 as shown. Duct 37 includes a gas control valve 39 and duct 38 includes a gas control valve 40 in the positions shown. Duct 38 extends to meet the fan 19 providing the induced draft for the apparatus.

Further recycle to the process plant 12 independant of the recycle route 20 including a gas control valve 42, and leading directly from the stack 18 above the induced draft fan 19 is provided to enable further temperature control of the gases fed to plant 12.

In normal operation valve 32 is set to permit a maximum volume of steam to pass from the boiler 33 to the plenum chamber 16. Valve 31 is operated in accordance with the signals supplied to the valve 22 in response to the need for control of the bed temperature to provide steam to the plenum chamber and therefore cool the bed and passes steam to the bed 13 when the bed temperature is outside the normal range adjustable by variation of the volume of recycled flue gas fed to the bed. The volume of waste gases issuing from the unit 10 and in the duct 11 passing to the plant 12, boiler 33 and then to the stack 18 is controlled by operation of the valves 39 and 40. For example when the plant 12 is operating at normal load valves 39 and 40 may each be 50% open. Should the load placed on the plant 12 be increased valve 40 could be further. Should the load on the plant 12 decrease valve 40 could be more nearly closed.

The potential output of the waste heat boiler 33 is controlled by operation of the bypass valve 39 situated at its outlet, that is to say downstream of the boiler, so that coordinated control of the valves 39 and 40 proportions the hot gas flow to the process plant 12 and parallel, minor, hot gas flow through the boiler 33.

As noted above in normal operation the valve 32 acts to control the maximum volume of steam which may pass from the waste heat boiler 33 to the plenum chamber 16. This valve would normally remain in this position, guaranteeing the supply of steam to the plenum chamber 16, when the bed is shut-down. When the bed is shut-down in normal operation the fans 17 and 21 are turned off the valve 22 closed. Valve 31 is fully opened such that steam passes from the boiler 33 into the bed 13 (the steam being drawn into the bed due to gas slippage induced by the fan 19). The steam which is passed to the bed in this way acts to cool the bed and enable its rapid shut-down.

If it is necessary to shut-down the plant in a near instantaneous manner, for example in a crash shut-down, valves 31 and 32 may both be fully opened such that steam is supplied to the plenum chamber 16 at the full output pressure of the boiler 33.

This influx of steam to the bed gives rise to a large endothermic reaction within the bed which quenches the combustion of fuel in the bed and allows safe, rapid shut-down of the plant.

It will be appreciated that the presently described arrangement provides means for controlling the rate at which steam is passed into the or ones of each of the plenum chambers feeding gas to arrays of sparge pipes in the bed, the control being affected in response to the bed temperature and reacting at a temperature level greater than the ultimate control level for recycled gas passed to the bed material. The waste heat boiler has the capacity for steam storage so that the flow of steam from the boiler to the plenum chamber 16 is in response to the bed temperature controls. The capacity of the boiler 33 may be adjusted by means of adjustment to bypass valve 39 to maintain the boiler working pressure at an optimum level.

In an alternative arrangement which is not shown in the accompanying drawings we provide an evaporator located in the secondary combustion zone of the hot gas generator 10 to which water is supplied from the header 28. The rate at which water is supplied to the evaporator is related to the design flow rate of a cooling system of the fluidized bed combustion unit and does not involve additional water consumption. The steam produced by the evaporator is routed via a flash header to the plenum chamber or chambers 16 feeding fluidizing gas to the fluidized bed combustion system. Whilst having some advantages of the waste heat boiler this particular arrangement suffers from the disadvantage of difficulty in control, lacking the ability for control given by valve 39.

It is to be emphasized that steam from the waste heat boiler 33 (or evaporator) above described does not act as a normal attemperation means displacing recycled gas and therefore reducing the improved thermal efficiency found when using recycled flue gas for bed attemperation, such as is described in our published U.K. Patent Specification No. 2030689A, but the waste heat boiler system is available for the operation of attemperation when desired and may supplement the recycled gas supply upon demand for any extreme operation or condition.

With regard to the softened water supply used to cool the chamber or water jacket 24 and also used to feed the waste heat boiler 33 (or evaporator) it is pointed out that this gives an advantage in providing that the passage of this water through the jacket 24 increases its temperature with the effect that the temperature of the water fed to the boiler 33 or evaporator is elevated.

INDUSTRIAL APPLICABILITY

Although described above with respect to a hot gas generator system it will be appreciated that the attemperation or control of operation of a fluidized bed making use of steam generated from waste heat produced in the combustion unit may be applied to other fluidized bed combustion unit arrangements and provide in those arrangements not only a means of supplementing the attemperation provided by the recycled flue or other inert gas but also provide a rapid and safe means of near instantaneous or crash-shut-down of the arrangements.

I claim:

1. A method of operating a fluidized bed combustion unit arrangement in which fluidizing gas is fed to a bed of particulate material via one or more arrays of sparge tubes or pipes extending generally horizontally through the bed, to fluidize the bed and support combustion of fuel passed thereto, wherein the fluidizing gas is formed by mixing in variable proportions air, an inert gas and steam, the steam reacting endothermically within the bed when the bed is operating to effect both physical and chemical attemperation or control of the temperature of the bed supplementing attemperation provided by the inert gas, the method providing the use of a waste heat boiler to generate the steam, to which boiler a proportion of the flue gases drawn from the unit are passed, the proportion of flue gases passed to the waste heater boiler being controlled in accordance with the proportion of steam required to be generated and passed to the fluidized bed in the combustion unit.

2. A method of operating a fluidized bed combustion unit arrangement in which fluidizing gas is fed to a bed of particulate material via one or more arrays of sparge tubes or pipes extending generally horizontally through the bed, to fluidize the bed and support combustion of fuel passed thereto, wherein the fluidizing gas is formed by mixing in variable proportions air, an inert gas and steam, the steam reacting endothermically within the bed when the bed is operating to effect both physical and chemical attemperation or control of the temperature of the bed supplementing attemperation provided by the inert gas, wherein the steam is generated in and supplied from the combination of an evaporator located in the secondary combustion zone of the unit, and a flash header.

3. A method in accordance with claim 1 or claim 2, wherein the inert gas is flue gas recycled from the outlet of the fluidized bed combustion unit, the volume of flue gases fed to the unit being controlled in dependence upon the required temperature of the bed and/or thermal demand placed upon the apparatus.

4. A fluidized bed combustion unit arrangement comprising one or more arrays of sparge tubes or pipes having tube plates extending horizontally through a bed of inert particulate material to which pipes fluidizing gas is fed to fluidize the bed and support combustion of fuel passed thereto, means for mixing in variable proportions air, an inert gas and steam to form the fluidizing gas, the steam reacting endothermically within the bed when the bed is operating to effect both physical and chemical attemperation of the bed supplementing attemperation or control of the temperature of the bed provided by the inert gas, wherein means are provided for enabling flue gas issuing from the apparatus to be recycled and used as the inert gas and wherein the steam fed to the bed is generated in the combination of an evaporator located in a secondary combustion zone of the unit above the bed and a flash header.

5. An arrangement according to claim 4 in which the evaporator is fed with water from a source used to cool the tube plates of sparge tubes feeding fluidizing gas to the bed.

* * * * *